United States Patent [19]
Chan et al.

[11] Patent Number: 5,912,949
[45] Date of Patent: Jun. 15, 1999

[54] VOICE-DIALING SYSTEM USING BOTH SPOKEN NAMES AND INITIALS IN RECOGNITION

[75] Inventors: Conway Chan, Los Altos; Craig A. Will, Fremont, both of Calif.

[73] Assignee: Northern Telecom Limited, Quebec, Canada

[21] Appl. No.: 08/743,933

[22] Filed: Nov. 5, 1996

[51] Int. Cl.⁶ ................................................... H04M 3/42
[52] U.S. Cl. .................................. 379/88.03; 379/88.01; 704/275
[58] Field of Search ................................ 379/67, 88, 89, 379/354, 355, 88.01, 88.02, 88.03; 704/251, 252, 254, 255, 257, 275

[56] References Cited

U.S. PATENT DOCUMENTS

| | | | |
|---|---|---|---|
| 3,742,143 | 6/1973 | Awipi | 379/355 |
| 4,313,035 | 1/1982 | Jordan et al . | |
| 4,348,550 | 9/1982 | Pirz et al. | 379/357 |
| 4,593,157 | 6/1986 | Usdan | 379/88 |
| 4,731,811 | 3/1988 | Dubus | 379/88 |
| 4,737,976 | 4/1988 | Borth et al. | 379/81 |

(List continued on next page.)

FOREIGN PATENT DOCUMENTS

| | | |
|---|---|---|
| 0 269 364 | 6/1988 | European Pat. Off. . |
| 0 408 041 A2 | 1/1991 | European Pat. Off. . |
| 0 431 890 A2 | 12/1991 | European Pat. Off. . |
| 0 477 854 A2 | 1/1992 | European Pat. Off. . |
| 0 493 292 A2 | 1/1992 | European Pat. Off. . |
| 06014098 | 1/1994 | European Pat. Off. . |
| 0 647 075 A2 | 4/1995 | European Pat. Off. . |
| 07282203 | 10/1995 | European Pat. Off. . |
| 07283858 | 10/1995 | European Pat. Off. . |
| 0732001 | 12/1995 | European Pat. Off. . |
| 0 709 996 A2 | 1/1996 | European Pat. Off. . |
| 3837385A1 | 5/1989 | Germany . |
| 06121014 | 4/1994 | Japan . |
| 07095279 | 7/1995 | Japan . |
| 7-336426 | 12/1995 | Japan . |
| 2 293 521 | 3/1996 | United Kingdom . |
| 2 292 043 | 7/1996 | United Kingdom . |
| 2315191 | 1/1998 | United Kingdom . |
| WO 87/07460 | 12/1987 | WIPO . |
| WO 94/14270 | 6/1994 | WIPO . |
| WO 96/07286 | 3/1996 | WIPO . |
| WO 96/38971 | 12/1996 | WIPO . |
| WO 97/19546 | 5/1997 | WIPO . |
| WO 97/37499 | 10/1997 | WIPO . |

OTHER PUBLICATIONS

Mark Fanty et al., "City Name Recognition Over The Telephone," pp. I–549–I552, 0–7803–0946–4/93, Apr. 27, 1993 IEEE.

VCS 2030 Voice Dialer User Manuel, pp. 1–17, undated.

Voice Dial Information, undated.

"Bell Atlantic Nynex Mobile Debuts Unique Voice Dialing Service, Talkdial," Bell Atlantic News Release, Feb. 15, 1996.

Rumelhart, David E., et al., Parallel Distributed Processing; Explorations in the Microstructure of Congnition Chapter 8: "Learning Internal Representation by Error Propagation," Vol. 1: Foundations, 1986, pp. 318–362.

Rosenberg, A.E. and Schmidt, C.E., The Bell System Technical Journal, "Automatic Recognition of Spoken Spelled Spelled Names for Obtaining Directory Listings," Oct. 1979, pp. 1797–1823.

Rabiner, L.R., et al., The Bell System Technical Journal, "A Voice–Controlled, Repertory–Dialer System," Sep. 1980, pp. 1153–1163.

*Primary Examiner*—Daniel S. Hunter
*Attorney, Agent, or Firm*—Finnegan, Henderson, Farabow, Garrett & Dunner

[57] ABSTRACT

A system for dialing a telephone by voice receives from a user a spoken name corresponding to a telephone number that the user desires to call and at least one initial. The systems uses both forms of speech information to retrieve a stored telephone number that corresponds to a stored name that best matches the spoken name.

12 Claims, 3 Drawing Sheets

U.S. PATENT DOCUMENTS

| | | | |
|---|---|---|---|
| 4,754,951 | 7/1988 | Konneker . | |
| 4,827,500 | 5/1989 | Binkerd et al. | 379/88 |
| 4,829,576 | 5/1989 | Porter | 381/43 |
| 4,853,953 | 8/1989 | Fujisaki | 379/88 |
| 4,864,622 | 9/1989 | Iida et al. | 381/41 |
| 4,924,496 | 5/1990 | Figa et al. | 379/142 |
| 4,928,302 | 5/1990 | Kaneuchi et al. | 379/88 |
| 4,945,557 | 7/1990 | Kaneuchi et al. | 379/67 |
| 4,959,850 | 9/1990 | Marui . | |
| 4,959,855 | 9/1990 | Daudelin . | |
| 4,961,212 | 10/1990 | Marui et al. | 379/67 |
| 4,979,206 | 12/1990 | Padden et al. | 379/67 |
| 5,007,081 | 4/1991 | Schmuckal et al. | 379/354 |
| 5,018,201 | 5/1991 | Sugawara | 381/43 |
| 5,042,063 | 8/1991 | Sakanishi et al. | 379/88 |
| 5,054,053 | 10/1991 | Sakanishi et al. | 379/88 |
| 5,111,501 | 5/1992 | Shimanuki | 379/355 |
| 5,155,763 | 10/1992 | Bigus et al. | 379/113 |
| 5,163,081 | 11/1992 | Wycherley et al. | 379/88 |
| 5,165,095 | 11/1992 | Borcherding | 379/88 |
| 5,168,548 | 12/1992 | Kaufman et al. | 704/200 |
| 5,181,237 | 1/1993 | Dowden et al. | 379/88 |
| 5,182,765 | 1/1993 | Ishii et al. | 379/88 |
| 5,185,781 | 2/1993 | Dowden et al. | 379/67 |
| 5,187,735 | 2/1993 | Herrero Garcia et al. . | |
| 5,204,894 | 4/1993 | Darden | 379/88 |
| 5,222,121 | 6/1993 | Shimada | 379/88 |
| 5,230,017 | 7/1993 | Alexander | 379/140 |
| 5,243,645 | 9/1993 | Bissell et al. | 379/211 |
| 5,267,308 | 11/1993 | Jokinen et al. | 379/354 |
| 5,274,699 | 12/1993 | Ranz | 379/142 |
| 5,301,227 | 4/1994 | Kamei et al. | 379/88 |
| 5,313,516 | 5/1994 | Afshar et al. | 379/67 |
| 5,315,649 | 5/1994 | Foster et al. | 379/355 |
| 5,325,421 | 6/1994 | Hou et al. | 379/67 |
| 5,329,578 | 7/1994 | Brennan et al. . | |
| 5,333,184 | 7/1994 | Doherty et al. | 379/115 |
| 5,335,261 | 8/1994 | Fujinaka | 379/67 |
| 5,353,330 | 10/1994 | Fujiwara | 379/67 |
| 5,353,336 | 10/1994 | Hou et al. | 379/67 |
| 5,357,596 | 10/1994 | Takebayashi et al. | 395/2.84 |
| 5,369,685 | 11/1994 | Kero | 379/67 |
| 5,371,779 | 12/1994 | Kobayashi | 379/68 |
| 5,392,342 | 2/1995 | Rosenthal . | |
| 5,394,464 | 2/1995 | Hanson et al. . | |
| 5,398,279 | 3/1995 | Frain | 379/140 |
| 5,414,759 | 5/1995 | Ishikuri et al. . | |
| 5,430,791 | 7/1995 | Feit et al. . | |
| 5,452,340 | 9/1995 | Engelbeck et al. | 379/67 |
| 5,452,397 | 9/1995 | Ittycheriah et al. | 704/240 |
| 5,465,401 | 11/1995 | Thompson | 379/357 |
| 5,467,383 | 11/1995 | Urasaka et al. | 379/61 |
| 5,479,488 | 12/1995 | Lennig et al. | 379/67 |
| 5,479,489 | 12/1995 | O'Brien | 379/67 |
| 5,483,579 | 1/1996 | Stogel | 379/88 |
| 5,487,111 | 1/1996 | Slusky . | |
| 5,488,652 | 1/1996 | Bielby et al. | 379/88 |
| 5,509,058 | 4/1996 | Sestak et al. | 379/201 |
| 5,509,103 | 4/1996 | Wang | 395/2.41 |
| 5,524,145 | 6/1996 | Parker | 379/197 |
| 5,553,125 | 9/1996 | Martensson | 379/140 |
| 5,568,546 | 10/1996 | Marutiak | 379/355 |
| 5,581,611 | 12/1996 | Yunoki | 379/211 |
| 5,583,564 | 12/1996 | Rao et al. . | |
| 5,592,546 | 1/1997 | Takahashi | 379/355 |
| 5,600,704 | 2/1997 | Ahlberg et al. . | |
| 5,638,425 | 6/1997 | Meador, III et al. | 379/88 |
| 5,642,411 | 6/1997 | Theis | 379/266 |
| 5,668,862 | 9/1997 | Bannister et al. | 379/201 |
| 5,684,868 | 11/1997 | Alexander | 379/140 |
| 5,706,339 | 1/1998 | Eisdorfer et al. | 379/211 |
| 5,712,957 | 1/1998 | Waibel et al. | 704/240 |
| 5,717,738 | 2/1998 | Gammel | 379/67 |
| 5,719,921 | 2/1998 | Vysotsky et al. | 379/88 |
| 5,724,411 | 3/1998 | Eisdorfer et al. | 379/93.23 |
| 5,742,674 | 4/1998 | Jain et al. | 379/209 |

VOICE-DIALING SYSTEM USING BOTH SPOKEN NAMES AND INITIALS IN RECOGNITION

RELATED APPLICATIONS

This application relates to U.S. Ser. No. 08/726,604, entitled "Voice-Dialing System Using An Adaptive Model of Calling Behavior," filed Oct. 7, 1996 and incorporated herein by reference.

BACKGROUND OF THE INVENTION

Field of the Invention

This invention relates generally to systems for telephonic communications with audio message storage and retrieval and, more particularly, to telephonic communications involving repertory or abbreviated call signal generation and abbreviated dialing.

Description of the Related Art

Voice-dialing systems enable telephone users to speak the name of an individual or destination into the microphone of a telephone handset to initiate a telephone call. Voice-dialing thus allows a connection to be made directly, and avoids the necessity of dialing telephone numbers or looking up names to locate corresponding telephone numbers and then dialing the numbers.

Examples of experimental voice-dialing systems appear in L. R. Rabiner, J. G. Wilpon, and A. E. Rosenberg, "A voice-controlled, repertory-dialer system," *Bell System Technical Journal*, Vol. 59, No. 7 (September, 1980), and U.S. Pat. No. 4,348,550 to Pirz et al. Longstanding problems with such systems, however, limited their performance in terms of both accuracy and computational speed.

Recent advances in automatic speech recognition have improved performance dramatically, particularly for systems that are not trained to a particular speaker, which have, until recently, performed much worse than systems trained to particular speakers. In addition, the increasing computational and memory capacity and decreasing cost of computing hardware have significantly improved the commercial viability for the simpler applications of speech recognition such as voice-dialing.

Limitations on the performance of voice-dialing systems, however, still significantly reduce their commercial applicability. Such systems frequently make mistakes, the rate of error increasing with increasing vocabulary size, changes in environment, unusual accents, and the use of foreign or unusual names that might be difficult to pronounce. This limited accuracy restricts the possible range of applications for conventional systems to those with limited vocabularies, tightly controlled environments, and small user populations. There are also restrictions placed on the hardware platforms on which the systems can run.

It is therefore desirable to seek techniques that will improve the accuracy, speed, and ease of use of voice-dialing systems. A number of alternative techniques have been used in the past. One approach uses an interactive scheme in which the user is asked to verify the name before dialing (e.g., "Did you say Amanda Graham?"), and presenting a different name if the user says "No." See, for example, U.S. Pat. No. 5,222,121 to Shimada, and U.S. Pat. No. 5,301,227 to Kamei et al.

SUMMARY OF THE INVENTION

There is, therefore, a need to improve the accuracy of voice-dialing systems. In accordance with the present invention, performance and ease of use of a voice-dialing system can be improved by providing a selection procedure that enables users to select a stored name corresponding to a spoken name by inputting one or more spoken letters associated with the spoken name when the system indicates that the spoken name alone is insufficient to select a name to initiate a telephone call.

In accordance with the present invention, as embodied and broadly described herein, a method for dialing a telephone by voice, comprises the steps of (a) receiving from a user a speech pattern corresponding to a name in a directory the user intends to call and at least one spoken letter associated with the name, and (b) retrieving a telephone number corresponding to a name associated with the speech pattern. The names in the directory may be represented by a sequence of orthographic letters, in which case the retrieving step may include the substeps of converting sequences of orthographic letters corresponding to the names in the directory into sequences phonemes, and comparing the sequences phonemes to the speech pattern to identify a sequence of phonemes for a name in the directory that best matches the speech pattern. Alternatively, the names in the directory may be represented by sound patterns, in which case the retrieving step may include the substeps of converting the sound patterns for the names in the directory to orthographic letters, and comparing the orthographic letters for the names in the directory with an orthographic representation of the spoken letter. In another alternative, when the names in the directory are represented by a sequence of orthographic letters, the retrieving step may include the substep of comparing the names in the directory with the speech pattern using a phoneme-level representation for the names as an intermediary.

In accordance with another aspect of the present invention, as embodied and broadly described herein, a method for dialing a telephone by voice, comprises providing a directory of different names represented by phoneme strings and corresponding telephone numbers, said phoneme strings including initials for each of the directory names, and providing a user with access to the directory to initiate a telephone call by inputting a speech pattern corresponding to a name in the directory and at least one letter for the name. The input speech pattern and letter being compared with the phoneme strings of the directory to select from the directory a telephone number for one of the directory names that best matches the name of the input speech pattern.

In accordance with yet another aspect of the present invention, as embodied and broadly described herein, a method for dialing a telephone by voice, comprises receiving from a user a speech pattern, the speech pattern indicating a name corresponding to a telephone number that the user intends to call. The speech pattern includes a spoken name and at least one letter corresponding to the spoken name. The method includes steps of utilizing the speech pattern to identify a portion of a directory containing different names and corresponding telephone numbers, providing to the user a selection of names from the directory determined to best match the speech pattern, and initiating a telephone call to one of the telephone numbers in accordance with the user's selection of a name.

In accordance with still another aspect of the present invention, as embodied and broadly described herein, a method comprises the steps of receiving from a user a speech pattern corresponding to a name in a directory the user intends to call, presenting the user with a name determined to correspond to the speech pattern, and receiving from the user an indication as to whether the presented name correctly matches the name the user intends to call. The indication includes at least one spoken letter associated with the name the user intends to call. This method may further include a step of retrieving a telephone number corresponding to a name associated with the speech pattern and spoken letter.

The present invention, as embodied and broadly described herein, may include apparatus having to components configured to perform functions similar to those performed in the methods summarized herein.

BRIEF DESCRIPTION OF THE DRAWINGS

The accompanying drawings, which are incorporated in and constitute a part of this specification, illustrate an implementation of the invention and, together with the description, explain the goals, advantages, and principles of the invention. In the drawings.

DETAILED DESCRIPTION

Figure 1:
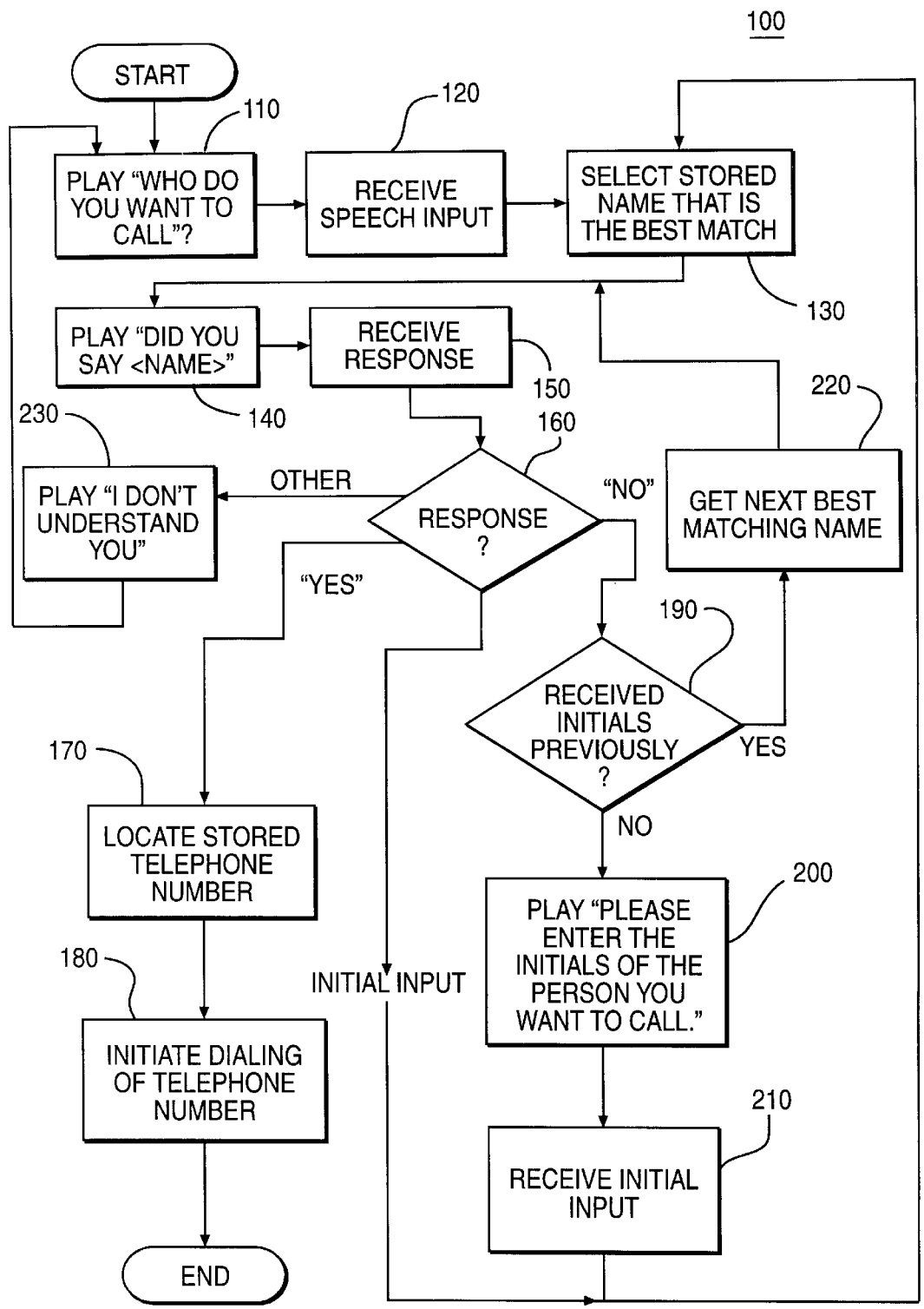
FIG. 1 is a flow chart of a procedure used to initiate telephone calls according to a preferred implementation of the voice-dialing system of the present invention.

Reference will now be made in detail to an implementation of the present invention as illustrated in the accompanying drawings. Wherever possible, the reference numbers used in the drawings will appear in the following description to refer to the same or like parts.

A. Introduction

A voice-actuated dialing system according to the present invention is built around a directory stored in the memory of a computer that holds names and associated telephone numbers. A person can use the system either locally, by picking up a telephone and speaking the name associated with the desired number, or by connecting from a remote location and speaking the name. The invention may be implemented in a personal computer having a telephone interface card and software to perform speech recognition and speech synthesis, to dial a telephone number, and to control the voice-dialing system. It may also be used to provide automatic directory assistance by speaking the number aloud rather than dialing it.

The architecture of the system consists of a speech recognition component, a speech synthesizer, and a controller. The first two components may use conventional techniques, with the speech recognition component recognizing input speech patterns representing names and comparing those patterns against stored names, and the speech synthesizer generating and outputting spoken phrases, including the stored names. The controller, however, uses a unique procedure to control the selection of stored names.

In particular, the controller uses a procedure in which the speech recognition component matches a spoken name against representations of different names in the directory to produce the name of the person that, based on a comparison of speech patterns for the spoken name with the speech patterns for stored names, the user most likely desires to call. The controller also engages the synthesizer to present the selected name to the user for verification. If the name presented is correct, the controller initiates another procedure to dial the corresponding telephone number in the stored directory. Alternatively, the controller permits the user to input individual spoken letters associated with the spoken name to facilitate the name selection process when the initial selection fails.

B. Voice-Dialing Controller Procedure

FIG. 1 shows a flow chart 100 of a voice-dialing procedure 100 that the controller uses to initiate telephone dialing. The steps of procedure 100 are preferably implemented in software.

Flow chart 100 assumes that a user has previously created and stored, such as on a hard disk, a directory of names and associated telephone numbers. One conventional software package that may be used to create such a directory is Microsoft Schedule+®, developed by Microsoft Corporation. This package includes a "contacts" capability for entering names and telephone numbers, the database of which can be accessed remotely by other application programs running under the Windows 95® operating system.

The speech recognition component processes the input speech data and attempts to match it against the set of stored representations corresponding to each name in the directory. In a speaker-independent recognition system, these representations are orthographic, consisting of sequences of letters spelling the names. A speech recognition system typically processes incoming speech in terms of the phoneme representations that correspond to the stored orthographic representations by means of rules for converting between phonemic and orthographic representations. An example of a speech recognition system with the desired capabilities is the "Model asr1500/M" speech engine from Lernout & Hauspie Speech Products N.V., Ieper, Belgium. This speech recognition system can run on a personal computer with a Pentium® microprocessor in close to real time without needing an additional coprocessor.

The speech recognition component can also use speaker-dependent technology, with names stored with phonemic representations. Such systems also require rules for converting phonemic representations to orthographic representations to process input letter sequences in selecting names.

Users wanting to place calls using the voice-dialing capability press a preset button on their telephone instrument or dial an extension that connects to the controller for the voice-dialing system. The controller then invokes the speech synthesizer to play "Who do you want to call" to the user via synthesized or recorded speech (step 110). The system then enters a wait state during which it waits for speech input from the user. Alternatively, if the user does not speak a name after some predetermined period, control may pass back to ask the user who he or she wants to call (step 110).

The controller then engages the speech recognition component to receive speech input for a name (step 120), and the speech recognition component processes the speech input by comparing it to the corresponding representations in the directory for each name. The component determines the name in memory that best matches the speech input (step 130), and instructs the speech synthesizer to play a combination of recorded and synthesized speech, "Did you say <name>?", where <name> is the synthesized speech from the stored representations corresponding to the best matching name (step 140).

The controller then waits to receive a response from the user (step 150). If the speech recognition component determines that the user said "Yes," the controller looks up the appropriate telephone number (step 170) and proceeds to dial it (step 180). Control procedure 100 is then finished.

If the user does not recognize the name as being the name of the person he intended to call, he can respond in one of two proper ways (step 160): By saying "No" or by speaking one or more initials as input. Although new users may simply say "No," experienced users will know to speak the initials corresponding to the first and last names, or to the first, middle, and last names. Alternatively, users may spell the full first and/or last name. In all cases, initial input accelerates the voice recognition process.

If the user enters such initials (step 160: initial input), the speech recognition component integrates the resulting information together with the name previously spoken to determine the name in the directory that is the best match (step 130). The controller then engages the speech recognizer to play "Did you say <name>?" with the new name (step 140), and the process continues.

If the user replies "No" either because the user is new to the system and does not know about entering initials, or has unsuccessfully tried to use initials (step 160: "No"), the system will test whether the user has already used initials (step 190). If so, the controller will instruct the speech recognition component to obtain the next best matching name (step 220) and the speech synthesizer to play "Did you say <name>?" (step 140).

If the initials have not been entered (step 190), the controller directs the speech synthesizer to play "Please enter the initials of the person you want to call" (step 200), and then waits to receive the initials (step 210). Once the initials are received, control passes to select a stored name that best matches the spoken name and letter sequence (step 130), and the process continues in the manner explained above.

If the user fails to respond or responds in a manner that is not recognizable by the system when requested to confirm a match (step 160: other), the controller instructs the speech synthesizer to play "I don't understand you" (step 230). Subsequently, process flow continues with step 110.

A number of variations on procedure 100 are also possible. For example, the system may ask the user directly for both the name and the initials of the desired name before any attempt to recognize the name is made. Also, other letter sequences may be used, particularly spelling out part or all of the first, last, or both names.

The determination of the best matching name using both the spoken name and spoken letter initials uses an "N best" matching algorithm in which possible matches are provided by the speech recognition algorithm in a list in decreasing best match together with a measure of the quality of that match. This is done for the name and for each of the letters. A calculation is made of the confidence level for each of the matches, and an overall estimate is determined of the best N matching names on the basis of all sources of information. This list of overall N best matching names is used to provide to the user the synthetically spoken name for verification, continuing to next best matches should the user respond to the verification request with a "No."

C. PBX-Based System Architecture

The voice-dialing system according to the present invention is particularly suitable for use with PBX-based systems. Such systems control calls from multiple telephones at a physical or virtual site.

Figure 2:
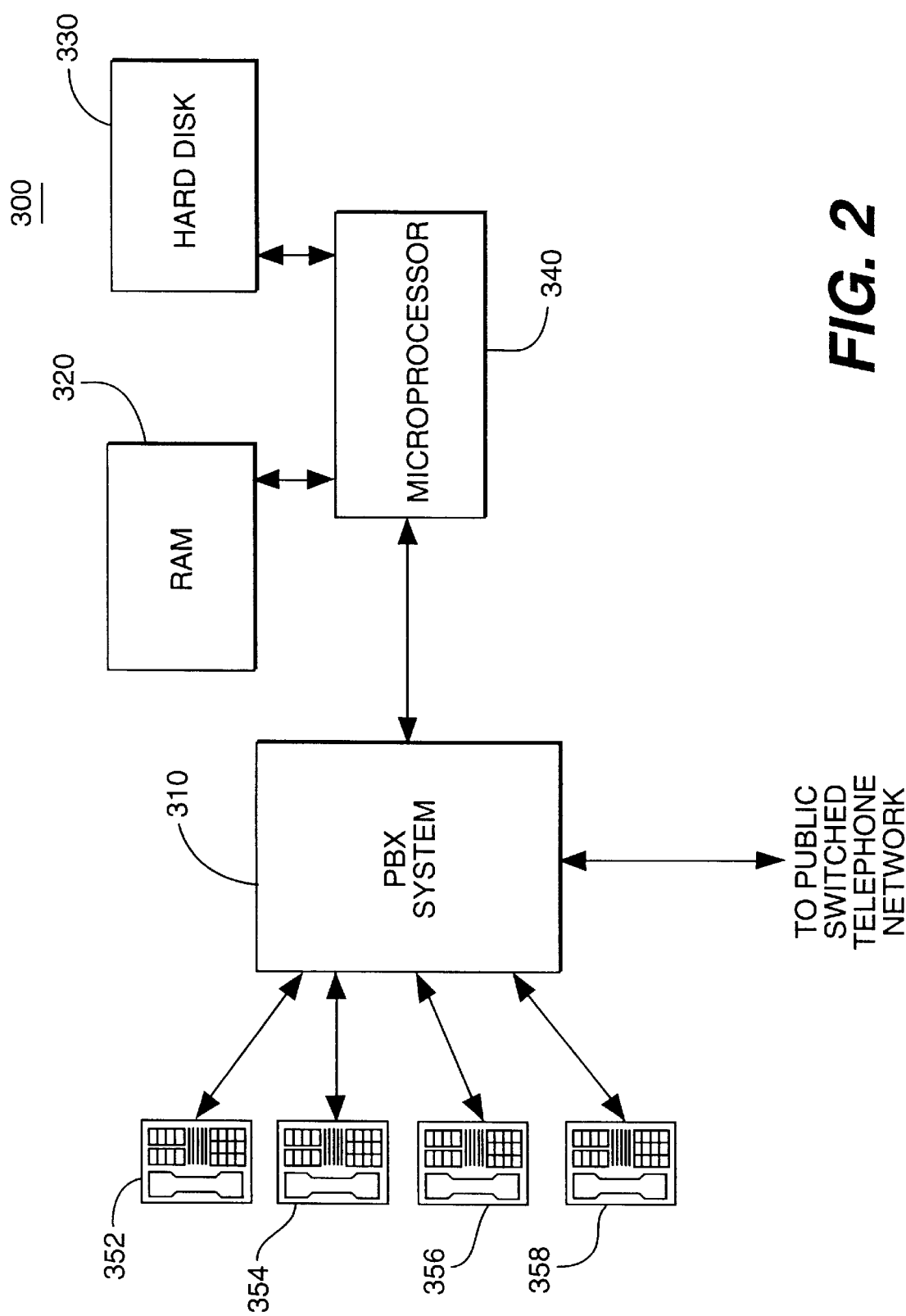
FIG. 2 is a block diagram of a PBX-based system in which the present invention may be implemented.

FIG. 2 illustrates an exemplary PBX-based voice-dialing system 300. System 300 includes PBX system 310, random access memory (RAM) 320, hard disk 330, and microprocessor 340. PBX system 310 also connects telephones 352, 354, 356, and 358 to a public switched telephone network. A typical PBX would have tens to hundreds of these lines. PBX system 310 may be a Northern Telecom Meridian 1® PBX system, with a T1 digital connection between microprocessor 320 and PBX system 310.

Microprocessor 340 may be a conventional microprocessor such as a Pentium processor. RAM 320 and hard disk 330 may also be conventional. In operation, however, they store the programs for the speech recognition component, speech synthesizer, and controller for voice-dialing. They also store the directory of names and corresponding telephone numbers that is available to users for purposes of implementing voice-dialing according to the present invention. The directory of names stored on hard disk 330 is updated from a directory maintained in PBX system 310.

When a user picks up the handset of one of the telephones 352–358 and initiates voice-dialing, the controller begins operation and microprocessor 340 executes software for control procedure 100 and the functions of the speech recognition component and speech synthesizer. When the user confirms the selection of a name from the stored directory, microprocessor 340 instructs PBX system 310 to place a call to the stored telephone number for the selected name.

D Personal Voice-Dialing System

Figure 3:
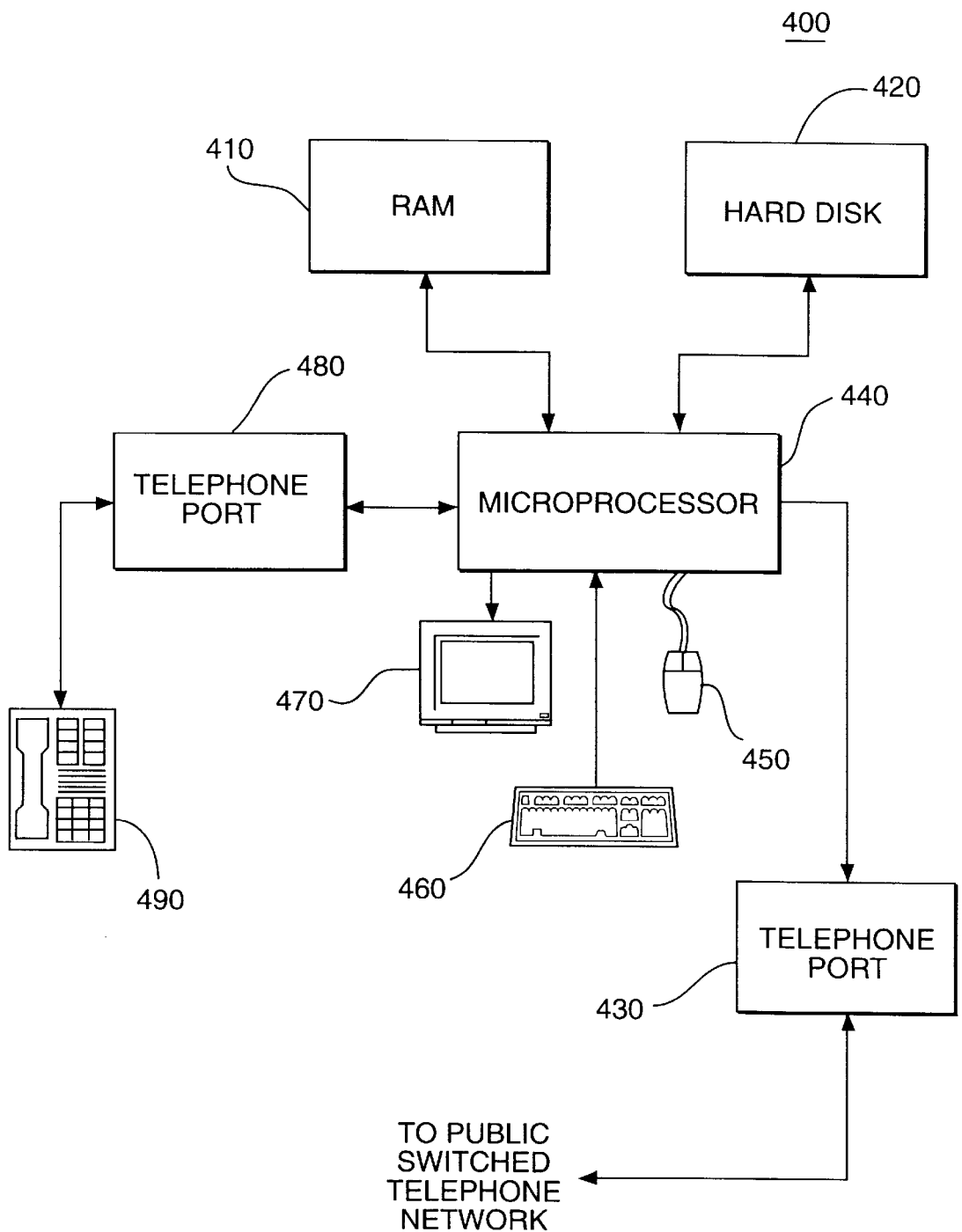
FIG. 3 is a block diagram of a personal directory system in which the present invention may be implemented.

FIG. 3 shows another architecture in which the voice-dialing system according to the present invention may be implemented. Personal directory system 400 includes hardware for a standard personal computer (for example, an IBM compatible personal computer), together with some additions related to telephony, and an ordinary telephone 490.

System 400 consists of RAM 410, hard disk 420, telephone port 430, microprocessor 440, mouse 450, keyboard 460, video display 470, and telephone port 480. These components may be standard off-the-shelf hardware. For example, microprocessor 440 may be a Pentium processor and video display 470 may be a NEC MultiSync 3V monitor. Telephone port 430 connects microprocessor 440 to a public switched telephone network, and telephone port 480 connects microprocessor to telephone 490.

The input/output devices, i.e., mouse 450, keyboard 460, and monitor 470, may be used to create a directory of names and telephone numbers used for voice-dialing. Telephone 490 may be used for the user to interface with the speech recognition component to create the stored representations for the names in the directory.

A standard graphical user interface for a conventional database application may be used for this function. The conventional database application, however, must interface with both the speech recognition component and speech synthesizer in the manner described above.

Alternatively, telephone port 480 and telephone 490 may be replaced by a microphone and speaker connected directly to microprocessor 440 via appropriate digital-to-analog and analog-to-digital converters and amplifiers. In this configuration, the microphone and speaker would be used for voice-dialing and data input.

When a user picks up the handset of telephone 490 and initiates voice-dialing, the controller begins operation and microprocessor 440 executes software for control procedure 100 and the functions of the speech recognition component and speech synthesizer. When the user confirms the selection of a name from the stored directory, microprocessor 440 places a call to the stored telephone number for the selected name.

D. Conclusion

Performance of voice-dialing systems can be improved by providing a selection procedure that enables users to select a stored name corresponding to a spoken name by inputting one or more spoken letters associated with the spoken name. This increases the accuracy of the automatic speech recognition component in matching of incoming spoken names with names stored in the directory. It also makes voice-dialing systems easier to use.

The present invention also facilitates fast and accurate voice-dialing within a site using a PBX system. According to this approach, a site-wide directory permits all users connected to the PBX system to use voice-dialing quickly, easily, and efficiently to make telephone calls.

The foregoing description of an implementation of the invention has been presented for purposes of illustration and description. It is not intended to be exhaustive or to limit the invention to the precise form disclosed. Modifications and variations are possible in light of the above teachings or may be acquired from practice of the invention. For example, the above description relates to voice-dialing systems, whereas the present invention may be implemented in connection with other types of systems that use a directory including speech patterns and employ voice input to select names or other identifiers from the directory. Voice-mail systems are an example of such other systems. The scope of the invention is defined by the claims and their equivalents.

What is claimed is:

1. A method for dialing a telephone by voice, comprising the steps of:
   receiving from a user a speech pattern corresponding to a name in a directory the user intends to call and at least one spoken letter associated with the name, wherein the names in the directory are represented by sound patterns;
   retrieving a telephone number corresponding to a name associated with the speech pattern;
   converting the sound patterns for the names in the directory to orthographic letters; and
   comparing the orthographic letters for the names in the directory with an orthographic representation of the spoken letter.

2. The method of claim 1, wherein the names in the directory are represented by a sequence of orthographic letters, and wherein the retrieving step includes the substeps of:
   converting sequences of orthographic letters corresponding to the names in the directory into sequences phonemes; and
   comparing the sequences phonemes to the speech pattern to identify a sequence of phonemes for a name in the directory that best matches the speech pattern.

3. The method of claim 1, wherein the names in the directory are represented by a sequence of orthographic letters, and wherein the retrieving step includes the substep of:
   comparing the names in the directory with the speech pattern using a phoneme-level representation for the names as an intermediary.

4. A method for providing voice-dialing to users, comprising the steps of:
   receiving from a user a speech pattern, the speech pattern indicating a name corresponding to a telephone number that the user intends to call, said speech pattern including a spoken name and at least one letter corresponding to the spoken name;
   utilizing the speech pattern to identify a portion of a directory containing different names and corresponding telephone numbers, wherein the names in the directory are represented by sound patterns;
   converting the sound patterns for the names in the directory to orthographic letters;
   comparing the orthographic letters for the names in the directory with an orthographic representation of the spoken letter;
   providing to the user a selection of names from the directory determined to best match the speech pattern; and
   initiating a telephone call to one of the telephone numbers in accordance with the user's selection of a name.

5. A method comprising the steps of:
   receiving from a user a speech pattern corresponding to a name in a directory the user intends to call, wherein the names in the directory are represented by sound patterns;
   converting the sound patterns for the names in the directory to orthographic letters;
   comparing the orthographic letters for the names in the directory with an orthographic representation of the spoken letter;
   presenting the user with a name determined to correspond to the speech pattern; and
   receiving from the user an indication as to whether the presented name correctly matches the name the user intends to call, said indication including at least one spoken letter associated with the name the user intends to call.

6. The method of claim 5 further comprising the step of:
   retrieving a telephone number corresponding to a name associated with the speech pattern and spoken letter.

7. Apparatus for dialing a telephone by voice, comprising:
   a receiver configured to receive from a user a speech pattern corresponding to a name in a directory the user intends to call and at least one spoken letter associated with the name, wherein the names in the directory are represented by sound patterns;
   a converter configured to convert the sound patterns for the names in the directory to orthographic letters;
   a comparator configured to compare the orthographic letters for the names in the directory with an orthographic representation of the spoken letter; and
   retrieving mechanism configured to retrieve a telephone number corresponding to a name associated with the speech pattern.

8. The apparatus of claim 7, wherein the names in the directory are represented by a sequence of orthographic letters, and wherein the retrieving mechanism includes:
   a converter configured to convert sequences of orthographic letters corresponding to the names in the directory into sequences phonemes; and
   a comparator configured to compare the sequences phonemes to the speech pattern to identify a sequence of phonemes for a name in the directory that best matches the speech pattern.

9. The apparatus of claim 8, wherein the names in the directory are represented by a sequence of orthographic letters, and wherein the retrieving mechanism includes:
   a comparator configured to compare the names in the directory with the speech pattern using a phoneme-level representation for the names as an intermediary.

10. Apparatus for providing voice-dialing to users, comprising:

a receiver configured to receive from a user a speech pattern, the speech pattern indicating a name corresponding to a telephone number that the user intends to call, said speech pattern including a spoken name and at least one letter corresponding to the spoken name;

identifying mechanism configured to utilize the speech pattern to identify a portion of a directory containing different names and corresponding telephone numbers name, said names in the directory are represented by sound patterns;

a converter configured to convert the sound patterns for the names in the directory to orthographic letters;

a comparator configured to compare the orthographic letters for the names in the directory with an orthographic representation of the spoken letter;

selection mechanism configured to provide to the user a selection of names from the directory determined to best match the speech pattern; and an initiator configured to initiate a telephone call to one of the telephone numbers in accordance with the user's selection of a name.

11. Apparatus comprising:

a receiver configured to receive from a user a speech pattern corresponding to a name in a directory the user intends to call, said names in the directory is represented by sound patterns;

a converter configured to convert the sound patterns for the names in the directory to orthographic letters;

a comparator configured to compare the orthographic letters for the names in the directory with an orthographic representation of the spoken letter;

presenting mechanism configured to present the user with a name determined to correspond to the speech pattern;

said receiver configured to receive from the user an indication as to whether the presented name correctly matches the name the user intends to call, said indication including at least one spoken letter associated with the name the user intends to call; and retrieving mechanism to retrieve a telephone number corresponding to a name associated with the speech pattern and spoken letter.

12. The apparatus of claim 11 further comprising:

retrieving mechanism configured to retrieve a telephone number corresponding to a name associated with the speech pattern and spoken letter.

* * * * *